United States Patent [19]

Thun

[11] 3,935,385

[45] Jan. 27, 1976

[54] MULTIPLEX CIRCUIT

[75] Inventor: Niels Thun, Vester-Sottrup, Denmark

[73] Assignee: Danfoss A/S, Nordborg, Denmark

[22] Filed: Feb. 3, 1975

[21] Appl. No.: 546,462

Related U.S. Application Data

[63] Continuation of Ser. No. 472,905, May 23, 1974, abandoned, which is a continuation of Ser. No. 309,704, Nov. 27, 1972, abandoned.

[30] Foreign Application Priority Data

Dec. 3, 1971 Germany ............................ 2160080

[52] U.S. Cl. ................................ 178/50; 179/15 A

[51] Int. Cl.[2] ........................................ H04J 3/04

[58] Field of Search........... 178/50; 179/15 R, 15 A, 179/15 BL, 15 BF, 15 BY; 340/182

[56] References Cited

UNITED STATES PATENTS

| | | | |
|---|---|---|---|
| 2,958,857 | 11/1960 | Johnson | 179/15 A |
| 3,135,874 | 6/1964 | Lucas | 179/15 A |
| 3,571,756 | 3/1971 | Skoog | 179/15 BL |

OTHER PUBLICATIONS

Engineering Electronics: John D. Ryder; pp. 391–394.

*Primary Examiner*—Thomas A. Robinson

[57] ABSTRACT

Several forms of multiplexing circuit are disclosed in which any selected one of a number of process responsive signal transmitters can be connected to a common measuring impedance by means of electronic switching devices individually associated with said transmitters. All transmitters are maintained energized at all times, whether or not they are addressed, to permit higher sampling speed.

8 Claims, 4 Drawing Figures

MULTIPLEX CIRCUIT

CROSS REFERENCE TO RELATED APPLICATIONS

Figure 1:
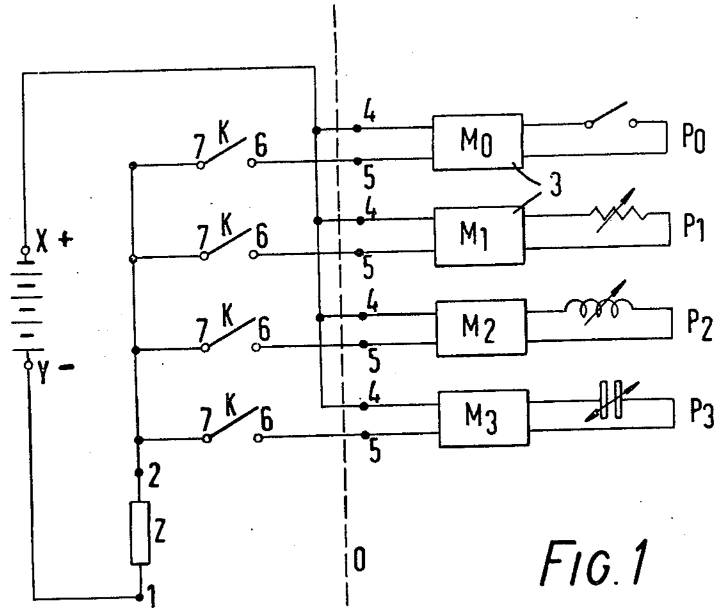

This application is a continuation of Ser. No. 472,905, filed May 23, 1974 and now abandoned, which was a continuation of Ser. No. 309,704, filed Nov. 27, 1972 and also now abandoned.

The invention relates to a multiplex circuit in which each of a number of process responsive signal transmitters can be connected to a common measuring impedance by means of a switching device.

In multiplex circuits of this kind a measuring point is associated with each switching position of the switching device. The measuring points can therefore be interrogated individually and the measured value reproduced with the aid of a common measured value receiver, which is generally a measuring impedance.

Multiplex circuits are known in which the signal transmitters (generally thermoelements, various piezo-electric pressure devices, and voltage transducers) supply a voltage directly as the measurement signal, whereas others supply a voltage indirectly by using a bridge circuit. This means that during switching over from one measuring point to another, voltages must be switched over and applied to the measured value receiver. Since the measured voltage represents the condition (e.g. temperature, pressure or humidity) detected at the measuring point, considerable demands are made upon the switching device since it is very important to avoid voltage drops along the line between the signal transmitter and the measured value receiver. For this purpose, use is often made of relays having gold contacts which are, however, expensive and relatively slow and lose their positive properties in the course of time. It is, however, very important to keep the contact resistance as small as possible. In those cases where a high switching speed is required, use has also been made of special semiconductor switching elements, such as for example field effect transistors. However, voltage drops also occur in these and this leads to a false measured value.

It is also known to use a voltage responsive current value as the measuring signal. A voltage responsive current signal of this kind can be produced by means of known two wire measurement transducers in which a specific signal current is generated for each measured value in the normal working range, this current being dependent upon the resistances occurring in the circuit (line resistance, contact resistance and others). A two wire measurement transducer of this kind is normally supplied from a central supply system; it could, however, also have its own supply system at the measuring point, the signal lines then only having to transmit the measurement currents. However, when a central supply system is used certain advantages are achieved, in particular, automatic monitoring of the signal lines. In these cases, the current is composed of a constant basic component of, for example, 4 mA which is used for operating the signal current transmitter, and a variable component dependent upon measured value, variable in the range 0 – 16 mA, so that the total signal current varies in the range 4 – 20 mA.

The object of the present invention is to provide a multiplex circuit of the initially stated kind in which high accuracy of measurement can be achieved.

According to the invention, a multiplex circuit of this kind is achieved by using as the signal transmitters, signal current transmitters which in a predetermined working range are independent of voltage, by at least one switching element with an associated control circuit being associated with each signal current transmitter, by connecting a first connection of the measuring impedence to one of the poles of a central voltage supply unit, the second pole of which is connected to the first pole of all the signal current transmitters, by connecting the second pole of each signal current transmitter to one of the sides of the associated switching element, and by the other side of all the switching elements leading to the second connection of the measuring impedance.

Thus, only that signal current which derives from an individual signal current transmitter addressed through a switching element passes through the measuring impedance by way of the addressed switching element. In such system the unavoidable volume drops in the switching element and in the rest of the circuit are unimportant. Furthermore, it is possible for only a single signal current transmitter to be energised at a given moment, so that the voltage or energy supply source requires to be rated for feeding only one signal current transmitter at a time.

The fact that such signal current transmitters can be rendered independent of voltage within certain limits offers considerable freedom in the choice of switching elements. Thus, for example, normal relays can be used without fear of the abovementioned errors in measurement.

Furthermore, semiconductor elements for example the commercially available inexpensive bipolar transistor, can be used with advantage in which the collector emitter gap forms a switching path. Voltage drops occurring in semiconductor elements of this kind do not result in any incorrect measurements in the multiplex circuit of the invention.

In addition, a permitted drop in voltage of this kind can be used for energising the switching element through its control circuit, so that an external control current is unnecessary for such energization. An external control current would possibly have an adverse effect upon the accuracy of the measured values. In a further form of the invention, the control current required for energizing the control circuit of the switching elements may be part of the signal current which passes through the measuring impedance in the 'on' condition, i.e. during measuring, and bypasses the measuring impedance in the 'off' condition.

If transistors are used as the switching elements, it is advantageous if the control circuit for a switching transistor incorporates a resistor connected between the base and a connection point between the switching transistor and the associated signal current transmitter, and if a diode is connected between the base and a switching point of a control signal source, and is so poled that its conductive direction, viewed from the base, is the same as that of the base emitter path.

When a switching transistor is energised, part of the signal current is passed to the base of the transistor through a resistor and is returned to the measuring signal conductor by way of the base emitter path and then flows through the measuring impedance. Thus, part of the signal current is used for energizing the transistor without adversely effecting the measurement.

In a circuit of this kind it is often advantageous if in each case a further diode is connected between the measuring impedance and the adjacent pole of at least one switching transistor and is so poled that the signal current in a conducting transistor flows through the diode in the conductive direction. Protection is thus afforded should the voltage across the emitter base path exceed the permitted reverse voltage.

Switching transistors and similar switching elements result in the operating voltage being applied to a signal current transmitter only when a switching element is addressed. Since, however, a short time elapses before the signal current transmitter is ready for operation and is able to send a well defined measuring signal, an upper limit is set to the rapidity with which scanning between several measuring points can take place. This phenomenon results from the fact that several resistors and condensers are incorporated in the signal current transmitter which give rise to time constants. If considerably faster scanning is required, the signal current transmitters must remain conductive continuously. In the case where a central supply system is used, this is achieved by using switching diodes as the switching elements. In a practical embodiment, each switching diode is connected to a control diode and, viewed from the signal current transmitter, each of the two associated diodes is poled in the same conductive direction, the control diodes being connected at each switching point to a control signal source, and the switching element diodes being connected to the common measuring impedance. If it is required to address a signal current transmitter, the first potential of the voltage supply is applied to the corresponding switching point; because of the voltage drop at the signal current transmitter, the control diode is blocked, and the signal current then flows through the switching diode and the measuring impedance to the second pole of the voltage supply. The switching point for the signal current transmitters that are not addressed are at the same time connected to the second pole of the voltage supply, and because of the voltage drop at the measuring impedance, the corresponding switching diodes are blocked. The measuring signal sent by the signal current transmitters that are not addressed is in each case returned through the control diode to the second pole of the voltage supply, thus bypassing the measuring impedance. With this type of circuit the voltage supply must be rated at a high level, as compared with that for a circuit comprising switching transistors, such that it is capable of powering all the signal current transmitters that can be in operation.

It is very advantageous if a central voltage supply is provided for the signal current transmitters and if each switching point for receiving a control signal can be connected to one or other of the poles of this central voltage supply through, for example, a logic circuit. The central voltage supply then also provides the control signal for the switching elements. The logic circuit can be controlled, for example, by binary signals.

Figure 2:
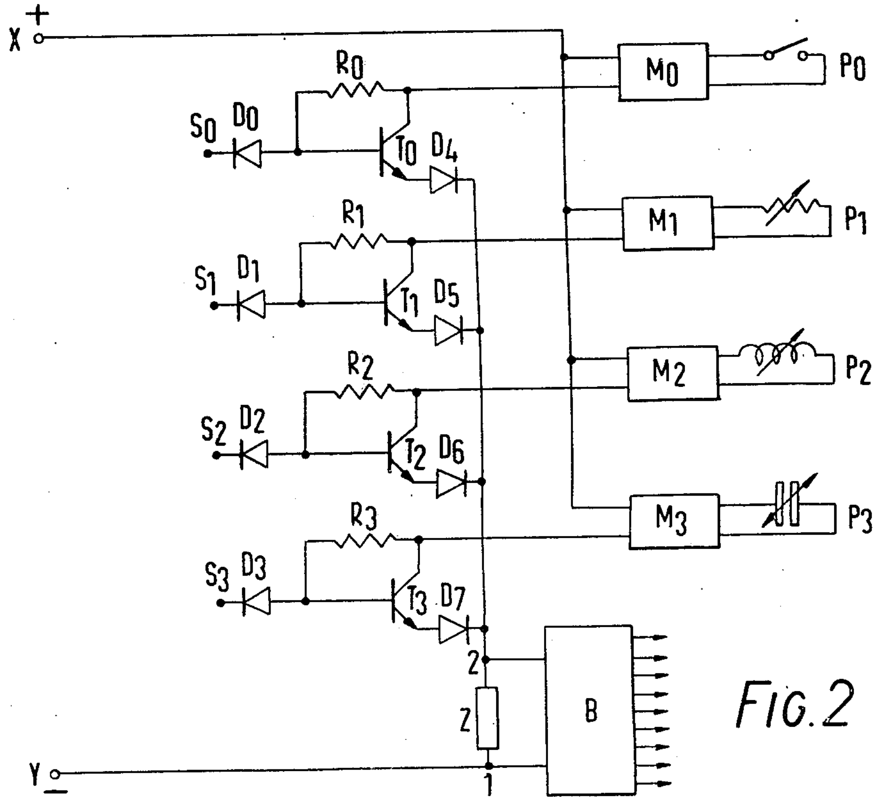
Figure 3:
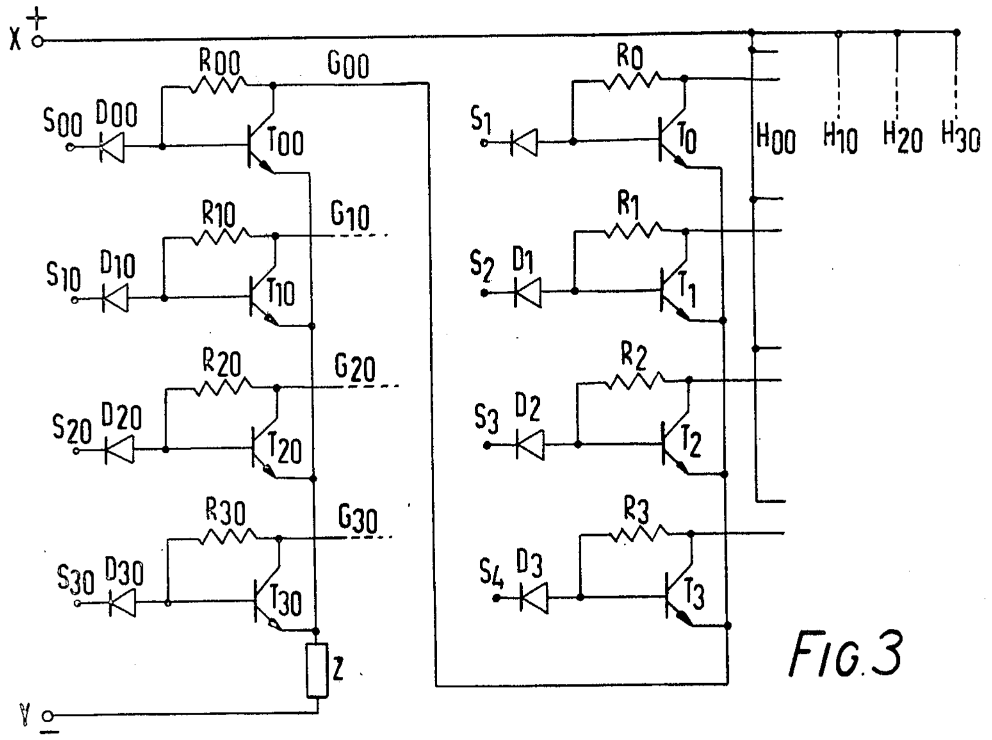
Figure 4:
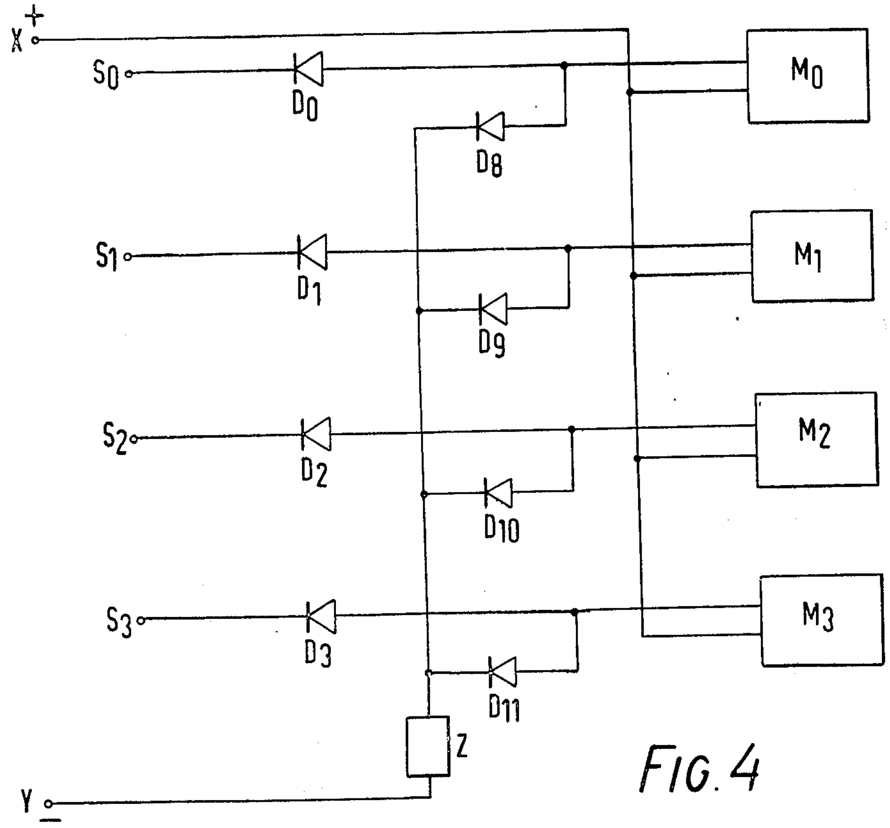

The invention will now be described in greater detail by reference to the arrangements illustrated in the drawing, in which:

FIG. 1 shows diagrammatically a basic form of current multiplex circuit in accordance with the invention, FIG. 2 illustrates a second form of current multiplex circuit in accordance with the invention, in which the switching elements are transistors, FIG. 3 shows a similar multiplex circuit for a larger number of signal current transmitters, and FIG. 4 shows a further form of current multiplex circuit in accordance with the invention, in which the switching elements are diodes.

FIG. 1 shows a measuring impedance with connections 1 and 2 and four measurement sensors $P_0$, $P_1$, $P_2$and $P_3$, each of which is associated with a measurement transducer $M_0$, $M_1$, $M_2$ and $M_3$, each constituting a signal current transmitter 3. The sensors may be of several different forms; for example, the measurement sensor $P_0$ is a simple switch, $P_1$ a variable resistor — for example a temperature-responsive resistor, $P_2$ a variable self inductance, and $P_3$ a variable capacitance — for example a pressure sensor. The transducers are two wire signal current transmitters, the first pole 4 of each of which is connected to a positive pole X of a central voltage supply, which also provides the energy for each signal current transmitter. Some of the signal current transmitters may also have their own energy supply unit at the measuring point, their first pole 4 being connected to the pole of such energy supply unit. The second pole 5 of each signal current transmitter is connected to one side 6 of a corresponding switching element X, the other side 7 of which is in each case connected to the connection 2 of the measuring impedance Z, the connection 1 of which is connected to the negative pole Y of the voltage supply. The drawing shows only four signal current transmitters 3; however, a larger number of signal current transmitters 3 and a corresponding number of contact element K can be used. To the left of the line O is shown a central part of the measurement system, and to the right of the line an outer part of the system.

It will be understood that FIG. 1 illustrates the simplest form of basic circuit in accordance with the invention, and in the following description it is assumed that a central voltage supply SF is used at all points.

The signal current transmitters are of a known construction in which, while measurements are being carried out, a signal current flows which is made up of a constant basic part and of a variable measurement part, e.g. a signal current in the range 4–20 mA, which is dependent upon the measured value. Higher signal currents, for example of 10–50 mA, can of course be used. In circuits of this kind monitorinig of the entire signal circuit is achieved by the basic part of the signal current of, for example, 4 mA magnitude.

If it is desired to carry out a measurement, one of the switching elements K is energised, and a current flows from the positive pole of the energy supply to the addressed signal current transmitter and from there back to the negative pole of the energy supply through the switching element X and the measuring impedance. Since the above-mentioned two wire signal current transmitters are to some extent independent of voltage and therefore transmit a current which is independent of voltage but dependent upon the measured condition, smaller voltage drops in the signal circuit, e.g. in the switching element, are of no importance. The requirements as regards contact resistance in the switching elements are therefore not so stringent, so that these elements may be either semiconductors or mechanical switching contacts.

The circuit therefore permits use of, for example, inexpensive bipolar transistors, the poles of the switching contacts being formed by the collectors and emitters.

FIG. 2 shows an arrangement of this kind, where the switching elements are transistors and the associated control circuits. A transistor $T_0$, $T_1$, $T_2$ or $T_3$ is associated with each measuring point, so that the measuring impedance, the collector emitter path of each transistor, and a signal current transmitter are connected in series with each other. The collector and base of each transistor are interconnected through a resistor $R_0$, $R_1$, $R_2$ or $R_3$. Furthermore, each base is connected to a switching point $S_0$, $S_1$, $S_2$ or $S_3$ through a diode $D_0$, $D_1$, $D_2$ or $D_3$ connected in opposition to the conductive direction of the base emitter path. Also, a further diode $D_4$, $D_5$, $D_6$ or $D_7$ is connected in series with each emitter in the conductive direction of the collector emitter path. The switching points can be optionally connected to the positive supply lead or the negative supply lead. The simplest way of achieving this is by the use of normal change over switches or, if rapid scanning of the measurement points is required, by logic circuits.

If the switching point $S_0$ is connected to the positive lead of the supply source, the diode $D_0$ is blocked, since a certain drop in voltage occurs in the signal current transmitter $N_0$. Since the base voltage is somewhat higher than the emitter voltage as a result of the voltage drop across the transistor, the latter becomes conductive. Consequently, the signal measuring current of the transmitter $M_0$ is divided into a base emitter current and a collector emitter current, which current parts are summated in the emitter and are passed together to the measuring impedance Z. It will be seen from this that the energy for controlling the semiconductor switching element is tapped from the signal measuring current, and that the necessary control current which provides the control energy is returned without causing an error in the value measured. The desired measurement, for example in the form of a voltage, can be tapped off from the measurement impedance Z. In the figure the voltage across the measurement impedance is evaluated by the apparatus B.

When the switching point $S_0$ is connected to the positive conductor X, the other switching points $S_1$, $S_2$ and $S_3$ should be connected to the negative pole Y of the supply. A current then flows from the positive pole X to the negative pole Y through, for example, the signal current transmitter $M_1$, the resistor $R_1$ and the diode $D_1$. The base of the transistor $D_1$ is, therefore, at a lower potential than the emitter, and the transistor is non-conducting. The resistor R can be so rated that the current flowing through it is low enough to keep the losses small. For example, this current can be considerably lower than the basic part of the signal current. Thus, the currents from the signal current transmitters $M_1$, $M_2$ and $M_3$ that are not addressed, bypass the measuring impedance Z and do not affect the result of the measurement.

FIG. 3 shows how, in the case of an existing multiplex circuit, the number of groups with connected signal current transmitters (and thus the number of these connected transmitters) can be increased by means of a further switching element; only four transmitters per group are shown in the figures, but the number may be greater. The switching transisters $T_0$ to $T_3$ shown in the right-hand portion are the same as those of FIG. 2 as regards construction and method of switching. The measuring points and the measurement transducers have been emitted from FIG. 3 for the sake of simplicity.

The output conductor $O_{00}$ is in this case not directly connected to the common measuring impedance Z, but to the collector of a further switching transistor $T_{00}$. This transistor operates in the same way as the switching transistors $T_0$ to $T_3$ and is controlled by a logic circuit similar to those used in connection with the latter transistors. Accordingly, a resistor $P_{00}$, a diode $D_{00}$ and a switching point $S_{00}$ are provided. Further groups of measuring points can be connected to the switching transistors $T_{10}$, $T_{20}$ of $T_{30}$ through the output conductors $G_{10}$, $G_{20}$ and $G_{30}$, the conductors leading to each of the measuring points $H_{00}$, $H_{10}$, $H_{20}$ and $H_{30}$ and being connected to the positive pole X of the voltage supply system. Each individual measuring point is therefore addressed by controlling two switching points, for example $S_2$ and $S_{00}$. In this case these two switching points are connected to receive positive voltage, whereas negative voltage is applied to all the other switching points.

In a corresponding manner, the multiplex circuit can be designed for connecting any required number of measuring points, control being effected, for example, by means of logic switching elements.

Relatively rapid scanning between the individual measuring points can be achieved with the above-mentioned circuit. This speed is, however, limited by the fact that when switching on, the currents and voltages in each signal current transmitter must first settle to stable values, which requires a certain minimum time on account of the resistors and condensers incorporated in the transmitters. FIG. 4 shows a circuit in which the signal current transmitters always carry the full signal current irrespective of whether they are addressed or not. In the illustrated example which shows four signal current transmitters, one pole of each transmitter is connected in the normal manner directly to the positive lead of the voltage supply. The second pole of each signal current transmitter is connected to two diodes, i.e. one of the switching element diodes $D_8$, $D_9$, $D_{10}$ or $D_{11}$ and one of the control diodes $D_0$, $D_1$, $D_2$ or $D_3$. These, seen from the signal current transmitters, are connected in the same conductive direction, and each switching element diode leads directly from the output of each signal current transmitter to a common measuring conductor which is connected to one of the connections of the measuring impedance Z, the other connection of which, as before, is connected directly to the negative conductor Y of the voltage supply. The output of each signal current transmitter is connected directly to a switching point $S_0$ to $S_3$ by way of a switching diode $D_0$ to $D_3$. If it is required, for example, to address the signal current transmitter $M_0$, the point $S_0$ is connected to the positive conductor, the control diode $D_0$ being blocked as a result of the voltage drop across the signal current transmitter $M_0$. The diode $D_8$ on the other hand because conducting, since a higher potential is applied to its anode than to its cathode, which is connected through the measuring impedance Z to the negative pole Y of the voltage supply. The diode switching points $S_1$, $S_2$ and $S_3$ should be connected to the negative pole Y at the same time, so that the currents from the signal current transmitters $M_1$, $M_2$ and $M_3$ are returned by way of the diodes $D_1$, $D_2$ and $D_3$ to the negative pole Y of the voltage supply. The potential at the anodes of the switching element diodes $D_9$, $D_{10}$ and $D_{11}$ is thus lower than the potential at their cathodes on account of the drop in measuring voltage across the measuring impedance Z caused by the signal current from the transmitter $M_0$. The diodes $D_9$, $D_{10}$ and $D_{11}$ are therefore blocked.

This circuit enables the individual measuring points to be scanned considerably more rapidly than a circuit as illustrated in FIGS. 2 and 3. However, for the purpose of operating all of the signal current transmitters simultaneously, the supply source must be large enough to supply all of the connected transducers.

I claim:

1. A multiplex circuit comprising a plurality of signal-current transmitters each of which in a predetermined working range is substantially independent of voltage and each of which has first and second terminals, a measuring impedance common to all said transmitters and having first and second terminals, a central voltage source having first and second poles, said first pole being connected to said first terminal of said impedance and said second pole being connected to said first terminal of each of said transmitters, and switching means comprising for each said transmitter a respective switching circuit having a first terminal connected to said second terminal of said transmitter and a second terminal connected to said second terminal of said impedance, each said switching circuit having a respective control means connected to said first terminal of the switching circuit and provided with a switching signal input terminal, each said control means being responsive to a first control signal applied to said input terminal thereof to close said switching circuit to cause a signal current to flow through said voltage source, the associated transmitter, the switching circuit and said impedance, and responsive to a second control signal applied to said input terminal thereof to open said switching circuit to cause a signal current to flow from said second pole of said voltage source, through the associated transmitter and direct from said first terminal of said switching circuit to said first pole of said source, whereby said signal current does not flow through said impedance.

2. A multiplex circuit according to claim 1 wherein each said switching circuit comprises a bipolar switching transistor.

3. A multiplex circuit according to claim 2 wherein each said control means is adapted to itself direct the signal current direct from said first terminal of said switching circuit to said first pole of said source when said second control signal is applied to said switching signal input terminal.

4. A multiplex circuit according to claim 3 wherein each said transistor has base, collector and emitter electrodes, said collector and emitter electrodes constituting said first and second terminals of said switching circuit, and each said control means comprises a resistor connected between said base and said first terminal of said switching circuit and a diode connected between said base and said switching signal input terminal and poled in opposition to the conductive direction of the base-emitter junction of said transistor.

5. A multiplex circuit according to claim 4 wherein a respective further diode is connected between each said emitter and said second terminal of said impedance and poled so that said signal current when flowing in said transistor flows in the conducting direction in said further diode.

6. A multiplex circuit according to claim 1 wherein each said switching circuit comprises a switching diode.

7. A multiplex circuit according to claim 6 wherein each said control means comprises a further diode, said switching diode and said further diode each having similar poles connected to said first terminal of said switching circuit.

8. A multiplexer circuit comprising:

a voltage source having first and second poles, a common measuring impedance having first and second terminals, said first terminal of said impedance being connected to said first pole of said source, and a plurality of switching circuits each having first and second terminals, said second terminals of all of said switching circuits being connected to said second terminal of said impedance, each said switching circuit having a respective control means connected to said first terminal of the switching circuit and each said control means having a switching signal input terminal;

said source, said impedance and said switching circuits all being disposed at a central location;

a plurality of signal-current transmitters each disposed remote from said central location and each having first and second terminals, each said transmitter being responsive to application of a DC energizing voltage across said first and second terminals to transmit through said terminals a small DC signal current which is substantially independent of said energizing voltage within a predetermined working range, said current comprising a fixed magnitude component and a component which varies in magnitude in accordance with the magnitude of a small DC voltage; and a plurality of wires extending from said central location to said transmitters, said wires connecting said first terminals of all of said transmitters to said second pole of said voltage source and each of said second terminals of said transmitters to the first terminal of a respective switching circuit;

each said control means being responsive to a first control signal applied to said switching signal input terminal thereof to close the associated switching circuit whereby said energizing voltage is supplied to the associated transmitter by said source and said signal current flows through said impedance, and responsive to a second control signal applied to said switching signal input terminal to open the switching circuit and to cause said signal current to flow direct from said first terminal of the switching circuit to said first pole of said source whereby said energizing voltage is supplied to the transmitter by said source and said signal current does not flow through said impedance.

* * * * *